March 5, 1968 J. W. GARRISON 3,372,014

APPARATUS FOR FORMING FIBERS

Filed June 7, 1965

JACK W. GARRISON
INVENTOR.

BY *John Kenneth Spies*

ATTORNEY

United States Patent Office 3,372,014
Patented Mar. 5, 1968

3,372,014
APPARATUS FOR FORMING FIBERS
Jack W. Garrison, Evanston, Ill., assignor to United States Gypsum Company, a corporation of Delaware
Filed June 7, 1965, Ser. No. 461,735
4 Claims. (Cl. 65—15)

ABSTRACT OF THE DISCLOSURE

Apparatus for forming fibers including a rotor with orifices through its wall and a distributor having a plurality of radially superposed foraminous layers within the rotor and contacting the wall.

---

Figure 1:
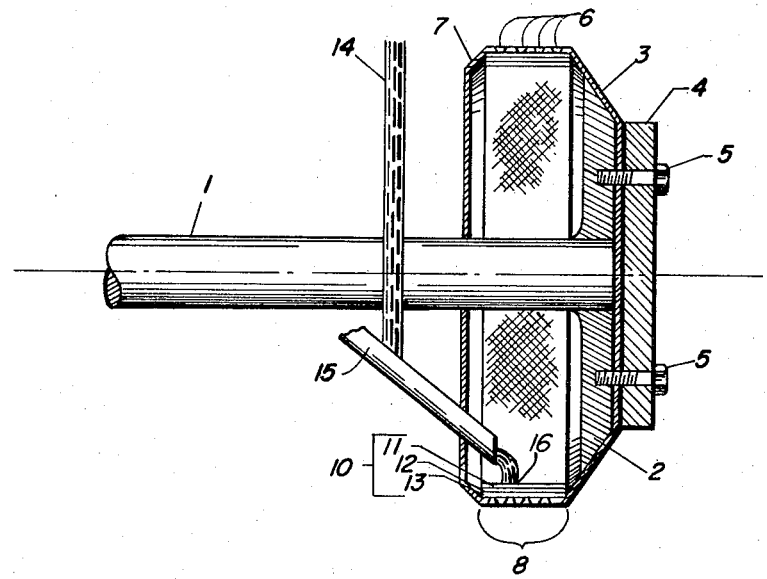

This invention relates to the manufacture of fibers from vitreous materials and more particularly to the manufacture of glass fibers.

In the manufacture of glass fibers, it is well known to employ a centrifugal type spinner rotating on a shaft and having a sidewall with a large number of fiber forming orifices. To obtain the most desirable fibers, it is necessary that these holes be small and this limits the quantity of glass which can be passed through each hole per unit of time. In order to obtain economical production, therefore, it is necessary to employ rotors with a large number of orifices, and it has become common to arrange them in a working area having 10 or more rows.

The glass fibers so manufactured are formed into nonwoven or felted batts and the like for insulation, filters, etc. For superior felting in the manufacture of these products, there are advantages in having the centrifugal rotor operate on a horizontal rather than a vertical shaft. However, it has been found that when the glass melt is deposited on the interior of a horizontally mounted rotor, it does not distribute itself uniformly over the side walls but is discharged almost immediately through the nearest orifices with the result that these are overloaded and others, particularly near the margins of the working area, are starved and therefore do not contribute a full measure to the potential production of the apparatus.

Centrifugal rotors operated on a vertical shaft function with a supplemental flinger adjacent the shaft to throw the melt radially upon the working area. This device, however, does not perform properly when the rotor shaft is operated in a horizontal or nearly horizontal position.

It is an object of this invention, therefore, to provide a distributor and a method for its operation by which the melt will be more evenly distributed to all the fiber forming orifices. A further object of this invention is to provide an apparatus which assists in maintaining a uniform temperature in the mass of fiber forming materials within the centrifuge so that more uniform fibers are produced.

A large amount of the heat required to maintain the centrifugal rotor at fiber forming temperature is supplied by the incoming molten fiber forming material. This practice requires that the molten material be substantially higher in temperature than the surface of the spinner with the result that the area upon which it impinges may become overheated and eroded. It is an object of this invention, therefore, to provide a means of distributing this high temperature heat supplying material more evenly over the working area of the centrifugal wall.

Other and more specific objects and advantages of the invention will appear by reference to the drawings and specification which follow.

The objects of this invention are obtained by the provision of a distributor located on the interior of a fiber spinning rotor adjacent to and in partial contact with the working area having the fiber forming orifices. The distributor is comprised of two or more radially superposed layers of perforate material and is employed as the primary means of spreading the melt to all the orifices.

In operation, the melt is not broken up into many coarse streams but is flowed by centrifugal force substantially continuously over and through the distributor to the several fiber forming orifices.

Referring to the drawings, FIG. 1 is a view of a centrifugal spinner mounted on a horizontal shaft and sectioned on a plane through the axis of the shaft.

The shaft 1 is mounted in a horizontal position and adapted to be driven by rotary means not shown. A base plate 2 is secured to the shaft to support rotor 3 which is held securely in place by flange 4 and a plurality of bolts 5. The rotor wall 7 has a large number of orifices 6 arranged substantially uniformly over the working area 8.

A supply of molten fiber forming material, not shown, is adapted to discharge a stream of melt 14 which is redirected by the trough 15 to the interior of the centrifuge where it is deposited at 16. To form fibers, the centrifuge is rotated rapidly and the melt forced out through the orifices 6.

The invention resides in the multiple layer distributor 10 located on the interior of the centrifuge and extending over at least most of the working area of the rotor wall. Each ply or layer is preferably made from wire screen but perforate metal plate may also be used. Plate which has been crimped or dimpled is especially suitable. In the drawing a distributor having three layers 11, 12 and 13 is shown, but a larger or smaller number of layers may be employed. The hole spacing and size may differ within a layer and from layer to layer or they may be the same. Screens and plates may be intermixed in the distributor.

Figure 2:
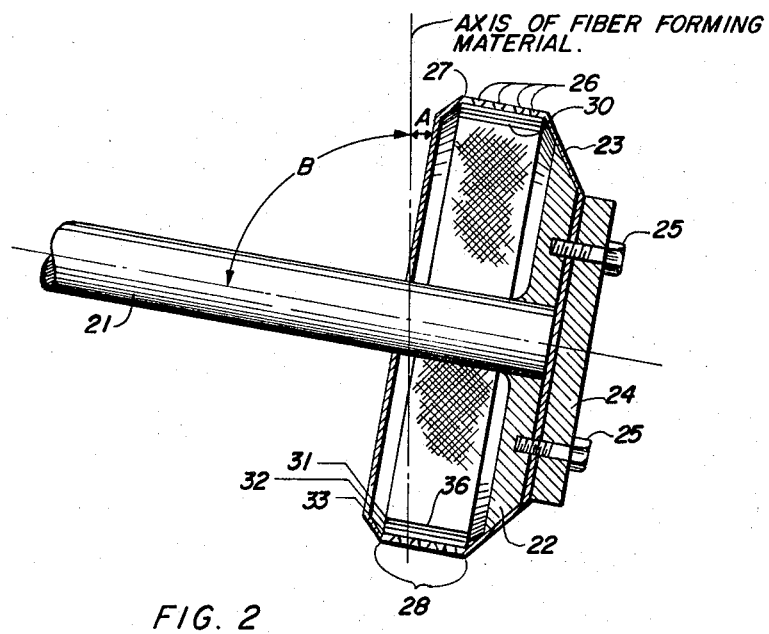

Referring to FIG. 2, another embodiment of the invention is illustrated in which the shaft 21 is displaced from the horizontal so that the fiber forming material may be deposited directly upon the distributor at 36.

As shown in the drawing, the shaft 21 is at an angle B of about 80° from the vertical. It is desired to operate the rotor with this angle as near to 90° as possible but this may be limited by the surrounding accessory attenuating burners, blowers, etc. (not shown) or by the design of the rotor itself. For example, the space A between the axis of the stream of melt and the edge of the rotor must not be reduced to such a small dimension that contact between the stream and edge of the rotor is probable. To the shaft is secured a base plate 22 which is adapted to support a rotor 23. The rotor is secured to the base plate by a flange 24 mounted with a number of bolts 25. The rotor has a wall 27 having several rows of orifices 26 distributed over a working area 28 on the wall of the rotor.

*Example I (comparison example)*

A rotor having a diameter of 12 inches and about 20 rows of orifices with a diameter of 0.020 inch to about 0.030 inch arranged in an area about two inches wide on the side wall was fed molten glass at about 600 to about 1000 pounds per hour. The rotor was positioned to receive a stream of molten glass as shown in FIG. 2. When the rotor was operated without a distributor, fiber forming material deposited in a stream on the interior of the working area reached only about 5 rows of orifices and those remote from the axis of the stream generally received little or none at all. As a result a relatively small number of very coarse fibers were formed, their size being such that they could not be attenuated to a diameter usually considered desirable for commercial products.

Example II

The rotor of Example I was next operated with a distributor of three layers of screen. Two layers adjacent to the rotor wall were relatively coarse, being made of wire having a diameter of 0.06", 8 to 10 wires per lineal inch being employed. The openings in this layer were about .035" square. The layer farthest removed from the wall of the rotor, that is, the innermost radially, was made of wires 0.03" in diameter with 14 to 16 wires per inch. The openings in this layer were about 0.030 inch square. Thus the area of each opening in the distributor was greater than that of a fiber forming orifice. The material of this distributor was type 304 stainless steel but any composition which is resistant to the temperatures employed and the corrosive effects, if any, of the material being spun into fibers may be used.

The distributor was placed within the centrifuge and over the working area randomly aligned with the fiber forming orifices. It was not secured to the wall of the centrifuge, centrifugal force being entirely adequate for retaining the distributor in its operative position. The glass was fed at the same rate as in Example I, and directed to intersect the distributor over about the middle of the working area. The glass was spread by centrifugal force over each successive layer and through the openings therein in a substantially continuous stream to supply 15 to 18 rows of orifices. By cooperative action the distributor and the orifices controlled the flow of the melt so that all the fibers were much finer than in the previous example.

Usually each layer of the distributor will be coextensive with the working area, but it may be desirable to provide additional partial layers, e.g., where the distributor intersects the axis of the fiber forming stream.

It will be apparent that this invention provides an economical and efficient means for distributing fiber forming material across the interior of the working area of a centrifuge. It is understood, of course, that this invention is not to be limited to the particular embodiment shown and described above, since many modifications may be made, and it is contemplated by the appended claims to cover such modifications as fall within the true spirit and scope of this invention.

What is desired to be claimed is:

1. An apparatus for forming fibers comprising a rotor with a wall having therein fiber forming orifices and a distributor within said rotor in contact with said wall, said distributor comprising a plurality of radially superposed foraminous layers.

2. An apparatus for forming fibers comprising a rotor with a wall having therein fiber forming orifices and a distributor within said rotor and in contact with said wall, said distributor comprising a plurality of radially superposed foraminous layers, the innermost layer having openings of a different size and number than the next adjacent layer.

3. An apparatus for forming fibers comprising a rotor with a wall having an area with fiber forming orifices in a plurality of rows and an annular distributor within said rotor and in contact with said wall in the area having said orifices, said distributor comprising a plurality of metallic foraminous layers, the radially innermost layer having openings smaller than the outer layer, but larger than said orifices.

4. An apparatus for forming fibers comprising a rotor of heat and wear resistant alloy having a side wall with an area with fiber forming orifices in a plurality of rows and a distributor within said rotor and in contact with said wall in the area having said orifices, said distributor comprising a plurality of foraminous layers, the openings in the layers of said distributor being larger than and randomly arranged with respect to said orifices.

References Cited

UNITED STATES PATENTS

| | | | |
|---|---|---|---|
| 3,031,717 | 5/1961 | Levecque et al. | 65—15 |
| 3,177,058 | 4/1965 | Slayter et al. | 65—15 |
| 3,273,358 | 9/1966 | Kleist et al. | 65—6 |

DONALL H. SYLVESTER, *Primary Examiner.*

R. L. LINDSAY, *Assistant Examiner.*